(12) United States Patent
Torres et al.

(10) Patent No.: US 8,088,315 B2
(45) Date of Patent: Jan. 3, 2012

(54) NON-WOVEN FABRIC

(75) Inventors: Manel Torres, London (GB); Paul Luckham, Middlesex (GB)

(73) Assignee: Manuel Torres, London (GB)

( * ) Notice: Subject to any disclaimer, the term of this patent is extended or adjusted under 35 U.S.C. 154(b) by 798 days.

(21) Appl. No.: 11/993,928

(22) PCT Filed: Jun. 28, 2006

(86) PCT No.: PCT/GB2006/002384
§ 371 (c)(1),
(2), (4) Date: May 29, 2008

(87) PCT Pub. No.: WO2007/000599
PCT Pub. Date: Jan. 4, 2007

(65) Prior Publication Data
US 2009/0036014 A1 Feb. 5, 2009

(30) Foreign Application Priority Data
Jun. 29, 2005 (GB) .................................. 0513349.1

(51) Int. Cl.
*D04H 1/72* (2006.01)

(52) U.S. Cl. ............................. 264/115; 264/6; 156/167
(58) Field of Classification Search ........................ None
See application file for complete search history.

(56) References Cited

U.S. PATENT DOCUMENTS

| | | | |
|---|---|---|---|
| 3,755,064 A | 8/1973 | Maierson | 161/174 |
| 3,772,136 A | 11/1973 | Workman | 161/169 |
| 5,684,068 A | 11/1997 | Boyer et al. | 524/40 |
| 2001/0021735 A1 | 9/2001 | Schulz | 524/155 |
| 2004/0028826 A1 | 2/2004 | Goecke et al. | 427/385.5 |

FOREIGN PATENT DOCUMENTS

WO WO 03/104540 A2 6/2003

*Primary Examiner* — Mary F Theisen
(74) *Attorney, Agent, or Firm* — Whitham Curtis Christofferson & Cook, PC

(57) ABSTRACT

This invention relates to non-woven fabrics, in particular to a method of making fabrics by spraying fibres onto a support member, and to a mixture of fibres, binder and diluent for use in the method of the invention. The present invention has the objective of providing a composition that can be used to produce fabrics having an improved texture and which gives excellent results when sprayed as an aerosol using a propellant.

23 Claims, No Drawings

NON-WOVEN FABRIC

FIELD OF THE INVENTION

This invention relates to non-woven fabrics, in particular to a method of making fabrics by spraying fibres onto a support member, and to a mixture of fibres, binder and diluent for use in the method of the invention.

BACKGROUND

Fabrics are required in a wide variety of applications and industries, including for instance the fashion and furniture industries, as well as being useful in a number of medical applications. Most commonly fabrics are woven fabrics, although it is also known to produce non-woven fabrics. The industries which require fabrics have a need for the provision of fabrics by methods which are flexible and convenient, and in particular methods which allow fabrics to be formed quickly and easily, from a variety of different fabric materials and in a variety of different shapes.

Our publication WO 03/104540 discloses a composition comprising fibres, a binder and a diluent which can be sprayed to produce a non-woven fabric. Producing fabric by spraying is advantageous as it allows application of the fabric to a wide variety of different surfaces and the fabric can conform to the contours of the surface.

The Examples in WO 03/104540 teach that polyvinylacetate or polyvinylbutyrate is used as a binder with ethyl acetate, acetone or methanol as a diluent. The general teaching suggests that diluents are selected from the group consisting of water, alcohols, ketones or esters having between 1 and 12 carbon atoms. Suitable binders are said to be polymeric, preferably polyvinylacetate. The composition can be sprayed using a spray gun, aerosol cans or artist=s airbrush.

Although the compositions exemplified in this publication give good results, there is room for improvement, especially in the formulation of compositions which give optimum results when sprayed from a standard aerosol can.

The present invention thus has the objective of providing a composition that can be used to produce fabrics having an improved texture and which gives excellent results when sprayed as an aerosol using a propellant.

SUMMARY OF THE INVENTION

A first aspect of this invention provides a composition for forming a fabric by spraying onto a supporting surface, the composition comprising fibres, a binder and a diluent characterised in that the binder is a thermoplastic elastomeric block copolymer.

A second aspect of this invention is an apparatus comprising a container containing the composition of the present invention and a device capable of producing a spray of the composition from the container.

A third aspect of this invention is a non-woven fabric produced by spraying a composition according to the present invention wherein the fabric comprises the binder in solid form and fibres bound by the binder.

A fourth aspect of this invention is an article comprising a non-woven fabric according to the third aspect of the invention.

A fifth aspect of this invention is a method for producing a non-woven fabric comprising the steps of:
a) providing a container containing a composition according to the present invention, which is capable of producing a spray of the composition and;
b) spraying the composition onto a supporting surface.

In the context of any method of spraying the fabric (for example with a spray gun, artist=s airbrush or aerosol can) the binders of the present invention are present in solid form in the fabric produced and give the fabric a highly desirable soft and flexible texture.

The binders of the present invention are soluble in a range of organic solvents including aliphatic hydrocarbons which are widely available and environmentally friendly. This allows a wide range of flexibility in the spraying method to be employed.

The binders of the present invention have the further advantage that they are compatible with most commonly used propellants and with the propellants that are preferred in the present invention. Polymers in this class can be chosen so as to be soluble in a solvent which is miscible with the propellant or even soluble in the propellant itself. Therefore, the composition of the present invention is particularly suitable for being sprayed from an aerosol can using a diluent comprising a propellant. This is economical and convenient for the user.

In the preferred embodiments of the present invention, the diluent comprises a propellant.

Aerosol cans work by using the energy stored in a compressed propellant to propel a composition, forming a spray. Therefore, aerosol cans are completely portable and do not need any power source or additional devices during use. It is desirable to use a propellant to form an aerosol to spray a fabric forming composition. When an aerosol is used it is not necessary to have a power source (which would be needed to operate a spray gun).

According to the broadest definition, an aerosol is simply a gaseous suspension of solid or liquid particles. In the context of this invention, a propellant is used to form an aerosol as in products which can be sprayed from standard containers colloquially described as "aerosol cans". The propellant is a gas at room temperature but is pressurised in the container to form a liquid. When an opening is formed in the container, the propellant expands, propelling any materials that are in the container out in the form of a spray, the droplet size and shape depending on the size and shape of the opening.

The present invention is advantageous as it gives very good results when sprayed from widely available standard "aerosol cans" using a propellant as some or all of the diluent.

When using propellants to form aerosols, it is particularly important that the rest of the composition, particularly the binder, is compatible with the propellant. Otherwise, the binder can precipitate and cause the fibres to aggregate. This causes problems such as blocking of the spraying device and leads to an inferior fabric.

In preferred embodiments of the present invention, the binder and propellant combination can be selected so that the binder is soluble in the propellant. In this case no additional solvent needs to be present. Alternatively, a separate solvent can be included in the composition where the binder is soluble in the solvent and the solvent is miscible with the propellant.

Thermoplastic elastomeric binders can be used in a composition for forming a fabric by spraying to minimise aggregation of fibres.

DETAILED DESCRIPTION OF THE INVENTION

The fabric of the present invention formed by spraying the composition of the present invention offers possibilities for binding, lining, repairing, layering, covering and moulding items. In the field of clothing for example, applying the fabric of the present invention by spraying to form a pocket or strap could instantly integrate a mobile phone into a jacket. Similarly sleeves could be added to a T-shirt for warmth dispensing with the need for a coat. Old garments could be recycled and updated in an instant. Fabric can be used in place of stitching giving freedom and ease when garments are designed and manufactured.

The "fabric" provided by the present invention is a non-woven textile material which depending on the exact formulation forms a textured fabric such as felt-like or fleece-like and leather like in texture and is soft and flexible.

The composition of the present invention is sprayed onto a solid "supporting surface". This can for instance be an item to which a piece of fabric is to be added or a mould or other surface from which the fabric, once formed, can be easily separated or peeled away.

Both the composition and the fabric of the present invention comprise "fibres" of fabric material which are slender, elongated structures having an aspect ratio (ratio of length to diameter) of at least 3:1 and preferably at least 5:1, more preferably at least 10:1.

The composition of the present invention comprises diluent in which the fibres and binder are soluble or dispersed.

The diluent may comprise propellant and/or solvent.

Where the composition designed to be sprayed from a spray gun or artist=s airbrush the diluent comprises a solvent in which the binder is soluble. Suitable solvents are discussed below.

When the composition is designed to be sprayed from an aerosol can, the diluent comprises a propellant. The propellant should be gaseous under ambient conditions (e.g. 20° C. atmospheric pressure) but which can be compressed to form a liquid in known manner. Where the diluent comprises a propellant it will usually (although not always) also contain a solvent for the binder. Such a solvent is miscible with the propellant. The diluent generally evaporates quickly when the composition is sprayed to form the fabric of the present invention.

Both the composition and the fabric of the present invention comprise a "binder" which is solid at ambient temperature and binds the sprayed fibres together. In the present invention the binder is a thermoplastic elastomeric block copolymer. This type of binder exhibits physical properties that enable it to form a soft and flexible fabric with the fibres and a compatibility with commonly used diluents including propellants. The binder should be solid at room temperature.

The molecular weight of the binder is usually between 10,000 and 5,000,000 preferably between 30,000 and 1,000,000.

The term "thermoplastic elastomeric block copolymer" is well known in the art and refers to a polymer made up from two or more "blocks" of different constituent monomers. The thermoplastic blocks have the property that the polymeric material softens on heating and hardens on cooling. Suitable monomers for use in the thermoplastic blocks are styrene or methymethacrylate.

The elastomeric blocks are made up from a polymer having elastic properties and may resemble natural rubber. The elastomeric block should be soluble in the diluent. Suitable monomers include dienes such as butadiene and isoprene, and hydrogenated dienes such as ethylene ran propylene and ethylene ran butylene.

Typically the thermoplastic elastomeric block copolymer comprises between 10 and 40% of the thermoplastic monomer by weight. Triblock polymers are preferred, in particular styrene-diene-styrene block polymers. The diene is preferably butadiene or isoprene or hydrogenated diene or isoprene polymers.

The first aspect of this invention is a composition for forming a fabric by spraying from a container onto a supporting surface, the composition comprising fibres, a binder and a diluent wherein the binder is a thermoplastic elastomeric block copolymer.

The binder type is chosen so that it is capable of binding the fibres together when the composition is sprayed onto a supporting surface but does not cause significant aggregation of the fibres in the composition before spraying.

The composition of the present invention comprises fibres. The fibres in the composition must be of a certain minimum length. Generally at least 80% of the fibres have a length of at least 0.02 mm. Preferably at least 90%, more preferably at least 95% and most preferably substantially all of the fibres in the composition have a length of at least 0.02 mm.

The fibres of the composition should not be too long since a composition comprising long fibres cannot be sprayed easily because the fibres can block a small nozzle. Generally, at least 80% (by weight) of the fibres have a length not more than 10 mm, preferably not more than 5 mm, more preferably not more than 1 mm, still more preferably not more than 0.5 mm, even more preferably not more than 0.25 mm, most preferably not more than 0.15 mm. Preferably, at least 90%, more preferably at least 95% and most preferably substantially all of the fibres have a length not more than 10 mm, preferably not more than 5 mm, more preferably not more than 1 mm, still more preferably not more than 0.5 mm, even more preferably not more than 0.25 mm, most preferably not more than 0.15 mm.

Preferably the fibres are milled before use to a length of approximately 0.15 mm.

Both synthetic and natural fibres may be used in the composition. Examples of fibres which may be used include:
Cotton fibres
Wool fibres
Silk fibres
Cashmere fibres
Linen fibres
Seaweed cellulose fibres
Ramie cellulose fibres
Mink fur fibres
Rabbit hair fibres
Aramid fibres
Chitosan fibres
Other natural fibres
Carbon fibres
Glass fibres
Metallic fibres e.g., steel, copper, silver etc.
Ceramic fibres
Alpaca fibres
Generally the fibres in the composition are at least 5, 10, 20, 30 or 40% (by weight of fibres) polymeric fibres.

In one embodiment of the present invention, conductive fibres such as carbon fibres are used. The resulting fabrics have electrical properties that make them suitable for a number of specialist applications.

In another embodiment, water absorbent fibres such as Super absorbent polymer fibres or particles are used to give a water absorbent fabric.

In a preferred embodiment most of the fibres in the composition are polymeric and organic, even though other fibre types may be used. Thus preferably at least 50, 60, 70 or 80%, especially at least 90%, of the fibres are polymeric. Most preferably only organic, polymeric fibres are used.

For the composition when sprayed to produce a non-woven fabric a sufficient binder to fibre ratio is usually desirable. For example the ratio of binder to fibres is preferably not greater than 10:1, more preferably not greater than 5:1 and even more preferably not greater than 4:1 or 3:1 and is preferably not less than 1:10, more preferably is not less than 1:5 and more preferably is not less than 1:4 or 1:3. Preferably, the ratio of fibres to binder is in the range 10:1 to 1:10, more preferably 5:1 to 1:5, most preferably 2:1 to 1:2.

The diluent in the composition of the present invention preferably comprises a propellant. The binder, fibres and any other components are soluble or dispersed in the propellant. It is particularly important that the binder is compatible with the propellant. In the present invention, the binder may be soluble in the propellant, or, optionally, a solvent is also present in which the binder is soluble where the solvent is miscible with the propellant. Hence, all the components of the composition are dispersed or dissolved homogeneously throughout the propellant. This means that spraying is efficient and the fabric produced is uniform. Aggregation of fibres within the composition or precipitation of binder leads to inferior results and may lead to blockage.

Generally the propellant is an organic compound but any suitable propellant can be used.

Suitable propellants include aliphatic hydrocarbons having a low boiling point (so that they are gaseous under ambient pressure conditions at room temperature) such as liquefied petroleum gas (LPG), which is a commercial product comprised mainly of propane and/or butane. It is also possible to use carbon dioxide as a propellant. Alternatively, volatile ethers can be used, such as dimethyl ether. Dimethyl ether is a particular preferred diluent as it is a propellant and can act as a solvent for the binder.

Typically propellants make up between 20 and 90% of the composition, preferably between 40 and 80%, more preferably between 50 and 70% and most preferably about 60% of the composition by weight based on weight of the whole composition.

The solvent that may be included in the composition as part or all of the diluent is also generally an organic compound. The solvent is typically liquid at room temperature but is volatile and has a low boiling point. The solvent has a boiling point of between 25 and 100° C., preferably between 30 and 75° C. more preferably between 30 and 60° C. and most preferably between 30 and 45° C. Solvents suitable for use in the present invention include diethyl ether, dimethoxymethane and petroleum ether (which is a commercially available mixture of alkanes generally having a boiling point of between 35 and 60° C.).

Ideally diluents are selected which are non-toxic and both environmentally and user friendly.

In a preferred embodiment the composition additionally comprises at least one agent selected from adhesive, dye, physiologically active ingredient, fragrance, powder, oil, and emulsifying agent. A lubricant such as silicone oil is advantageously added to the composition to aid spraying. A stabilizer may also be used which helps to ensure the fibres do not aggregate. Dispersants, such as oil soluble surfactants are suitable for this purpose.

For different colours of spray-on fabric, dyed fibres may be used, or small quantities of dye can be added directly to the diluent. Preferably the fibres are pre-dyed before inclusion in the composition. Food dyes are particularly suitable. Any dye soluble in the diluent can be used, if the fibres are undyed.

If the spray-on fabric is required to adhere to a surface, an adhesive agent may also be incorporated. Adhesives used for spray contact photographic mounting are particularly suitable.

Perfumes may be included in the composition to give the fabric a scent. In one embodiment, perfume is included in the composition and dyed fabrics are used or dye is included in the composition so that on spraying a coloured scented fabric is produced. This can have the effect of being a "visible perfume".

Other materials that could be added to the composition to be sprayed along with the fibres include:
Wood (saw dust)
Feathers
Metallic powders e.g., steel, copper, silver etc.
Titanium dioxide
Nano-silica
Micro/nanocapsules containing:
  Oils: e.g. citronella, eucalyptus, neem etc
  Drugs
  Vitamins
  Surfactants
  Moisturisers
  Natural antibiotics
  Proteins
Health & beauty products such as: deodorants and antiperspirants Preferably, at least 50%, 75%, 85% or 95% by weight of the total solids in the composition are fibres.

The additional agents must be selected so that the fibres do not aggregate when in the composition. Some agents e.g. dispersants such as surfactant, in particular organic solvent soluble surfactants may be added to prevent aggregation of fibres in the composition.

The choice of binder and other components also has an effect on the viscosity of the composition. If the viscosity is too high the composition will be difficult to spray. Preferably, the composition has a viscosity in the range 10 mPas to 100 Pas, more preferably in the range of 100 mPas to 10 Pas, even more preferably 1-10 Pas. The viscosity of the composition is measured using a concentric cylinder rheometer (Paar Physica Universal Dynamic Spectrometer [UDS] 200) at a temperature of 25° C.

The skilled person will understand that it is not necessary to use only one type of fibre or diluent or binder in the composition. Blends of more than one fibre and/or diluent and/or binder may be used in the same composition. Additionally if the composition comprises additional agents, one or more additional agents may be used in the same composition.

A second aspect of this invention is an apparatus comprising a container containing the composition of the present invention and a device capable of producing a spray of the composition from the container. Preferably, the device capable of producing a spray has a nozzle with internal diameter of 0.05 to 2 mm, more preferably 0.1 to 1 mm.

When the diluent comprises a propellant the container is preferably an aerosol can pressurised to a pressure of above 1 and up to 20 atmospheres, preferably between 5 and 20 atmospheres, more preferably between 5 and 15 atmospheres, more preferably about 8-10 atmospheres, depending on the particular propellant used. By "aerosol can" we mean a metal container of the type commonly used to store pressurised products such as hair spray and shaving foam. The propellant is a liquid inside the pressurised container but evaporates on expansion when it is sprayed out.

A third aspect of this invention is a non-woven fabric produced by spraying a composition of the present invention, wherein the fabric comprises the binder in solid form and fibres bound by the binder.

Preferably, the fibres in the fabric are conjugated and are longer than the fibres in the composition. We believe that the fibres in the fabric are formed from shorter fibres in the composition joined by binder so that they partially overlap.

The conjugated fibres are at least 1 mm, preferably 2 mm, more preferably 5 mm, still more preferably 10 mm, even more preferably at least 20 mm, yet more preferably about 50 mm in length.

A fourth aspect of this invention is an article comprising a non-woven fabric according to the third aspect of this invention. Preferably the article is selected from a piece of clothing, furniture or millinery item.

A fifth aspect of this invention is a method for producing a non-woven fabric comprising a) placing the composition in a container capable of producing a spray, and b) spraying the composition onto a supporting surface. Usually, substantially all the diluent evaporates before the composition reaches the supporting surface thereby forming a non-woven fabric on the supporting surface.

When the diluent comprises a propellant, the container is pressurised as stated above by conventional methods.

During spraying the spray should be fine so that any solvent present can evaporate from the composition and the fibres are able to conjugate during spraying.

Preferably, the device capable of producing a spray has a nozzle with internal diameter 0.05 to 2 mm, more preferably 0.1 to 1 mm. This provides the fine spray. Preferably, conjugated fibres form during step b) so that the average length of fibres in the formed non-woven fabric is greater than the average length of fibres in the sprayed composition. Preferably, the spray formed in step b) is a fine jet or spray with droplet size of less than 1 mm.

There are interacting factors which determine the type of fabric produced by spraying the composition of the present invention.

Different propellants and/or solvents can have an effect on the resulting fabric as can changes in the fibre and binder contents as well as the fibres and binders used.

Changes in the distance from the spray point to the supporting surface can lead to differences in the resulting fabric. When the spray point is close to the supporting surface the fabric adheres more closely or strongly to the supporting surface. If the spray point is too close to the supporting surface a non-woven fabric is not produced and instead a film can form. Preferably, the distance between the spray point and the supporting surface is greater than 10 cm, more preferably greater than 30 cm, more preferably 50 cm. The distance needs to be sufficient to allow the majority of the diluent/propellant to evaporate before it hits a surface.

It has been found that if the amount of diluent is increased the optimum spraying distance increases. Similarly, likewise, as the boiling point of the propellant and/or solvent increases the optimum spraying distance increases.

When the spray point is further away from the supporting surface the non-woven fabric which forms is easily peeled from the support surface so that the fabric remains as a coherent layer. Preferably, the non-woven fabric is easily separated from the supporting surface.

The velocity of the composition when it leaves the spray point and when it arrives at the supporting surface can also affect the resulting fabric.

The methods and compositions of the invention may be used for a wide range of applications, some of which are listed below:

1. Spray on embroidery for clothing and furniture
2. Seamless clothing: if a pair of trousers (for example) is sprayed onto a mould and unpeeled from the mould there will be no seams in the final garment.
3. Millinery, where hats can be made by spraying fabric to a mould, this would make the production considerably cheaper
4. Joining and repairing fabrics/clothing
5. Direct spraying onto the human body e.g. tattoos, visible perfume, scratch and sniff
6. Lining for garments
7. Producing>smart=clothing e.g. a jacket with a mobile phone incorporated to it by spraying over the>smart=device, for example
8. Sportswear, e.g. spray on ankle, knee supports etc
9. Bandages e.g. burns bandages or fracture casts
10. Controlled release patches, such as nicotine patches, insulin patches, spray-on patch for menopause, spray-on patch for contraceptive
11. Applying a fabric feel to hard surfaces, such as plastics, wood, metal etc.
12. Laminating
13. Finishing
14. Embossing
15. Adhesives
16. Bonding or holding items against clothing or skin e.g. sensors (thermal sensors or to protect from UV light), or microchips
17. Home furniture, car interiors, planes, hospitals and military applications etc
18. Covering membrane garments and a multitude of other structures from a bra to a temporary tent for example
19. Other applications could include using the technology as an instant cleaning product without using the process of the washing machine and as a solar power spray to charge technology in garments.
20. Spray-on fabric can be charged with a battery or from electric power to make the non woven fabric conductive for a period of time.
21. Spray-on fabric technology can be sprayed by spray-jet for industrial applications (e.g. J-cloths, shoe-shine cloths etc.) and also can be used in computerised ink-jet printers for any surfaces: fabrics, paper, hard surfaces etc
22. The technology can be used in conjunction with other additives of formulations, such as
   Particles
   Absorbing UV particles
   Metal powder
   Anti-bacterial agents
   Sun screens
   Fragrances
   Pigments and dyes
   Lotions transferred to the skin to moisture and heal etc.
23. Can also be used for the following technologies:
   Polymer technology
   Nano-technology
   Bio-chips
   Medical
   Composites
   Tissue engineering The following is a discussion of some of the possible applications of non-woven spray-on fabric Textile Design Applications Spray-on fabric can also be used to create fabric effects on other fabrics or directly onto the skin. Depending on the thickness of the applied layer, customised degrees of transparency and opacity can be obtained, and the same spray can be used for winter or summer clothing.

Depending on the concentration of suspended fibres, and in the size and design of the spray nozzle, the fabric can be diffused in various ways from thin jets to dispersed clouds of varying density.

It can also be used to simulate embroidery, to provide multiple surfaces giving 3D and embroidery effects.

Fashion Design Applications

Spray-on fabric can be used as a substitute for hand sewing. Its flexible and innovative nature makes it a very attractive product for "haute couture", allowing the production of sophisticated instant garments and details. For example it can be used to create collars, pockets and embedding of beads, sequences or crystals, reducing drastically the production times and the costs of garments.

High street fashions can also benefit from spray-on fabric applications. It can help bridge the gap between costly and exclusive hand-sewn couture pieces, and mass produced clothing. High street customers will have a wider choice when buying. They might acquire a designer=s item that already incorporates spray-on fabric, or buy a standard item and customise it using the spray themselves. Time consuming ornamental techniques can be revolutionised by the spraying techniques. Also, clothes from different seasons can be updated easily and at a low cost, an important feature for a society that is demanding more sustainable forms of consumption.

Applications: Instant pockets, sleeves, easily removable and re-locatable fastening and sealing pockets, jackets, etc, ornamental techniques (embedding, embroidery).

Manufacturing Uses

Most techniques used in clothing manufacturing can be recreated by the applications of spray-on fabric. The development of the product takes into account the way in which garments, are constructed, with the view to quicken and simply the manufacturing of clothes. Some of the ways in which spray-on fabric can be used to substitute or complement current techniques are outlined below.

Design

Spray-on fabric can be used by fashion designers as a 3-D sketch tool in conjunction with traditional sketching techniques, such as hand drawing, computer graphics. It can revolutionise the making of scale models, allowing work directly on mannequins, in life-size and getting the real feel of fabric.

Pattern

The making of patterns can be speeded up by spraying the fabric directly onto a mannequin or a model, and then simply peeling it off. Using the spray for pattern making can make the need for paper patterns redundant, as the peeled off pattern functions both as a pattern and a toile.

Fitting & Correction of Patterns

During fittings, different sections of the garment can be worked on without resorting to pins and sewing. This would not only mean a speeding up of the fitting process, but it is also a much more flexible and creative way of rearranging sections and details. Using spray-on fabric for fittings gives designers a chance to introduce substantial changes to a garment, past the design stage.

Spray-on fabric also allows the amalgamation of pattern and toile into one, turning fitting and correction of patterns into a single combined task.

Construction of the Garment

The process of interlining can be improved with the application of spray-on fabric. Interlinings between the top cloth and the inside lining are used to keep the shape of the garment, but also to reinforce, layer or insulate. Any material or garment could be interlined with a felt-like spray-on fabric.

Interfacing can be simplified by the application of thicker layers of spray-on fabric to selected parts such as collars and cuffs.

Spray-on can be used in several ways for binding. It can function simply as an adhesive material, holding the top cloth, padding and lining together, but also as a padding material in its own right. The spray-on fabric solution can be made water-resistant, anti-static or flame-resistant, increasing its versatility and functionality as an interlining material.

Other possible applications include making garments with embedded electronic devices such as telecommunication devices, body state sensors, or different kinds of transducers; making garments including heating elements, and producing fabrics which have electrically conducting or "touch sensitive" properties.

It is possible to use this invention to make wet wipe by using a diluent that comprises two different materials having different properties. In detail, the diluent should comprise a first carrier in which the binder is dissolved and a second carrier wherein the boiling point of the second carrier is at least 40° C. and is higher than the boiling point of the first carrier. On spraying, the composition the first carrier substantially all evaporates leaving the second carrier, which is less volatile, to become impregnated in the fabric. Hence, the fabric is "wet" with the second carrier.

EXAMPLES

Some embodiments and applications of the invention will now be described by way of example.

Example 1

Use of Dimethyl Ether as a Propellant and Solvent

The dry ingredients were placed in a 100 ml aerosol can before clamping (inserting the valve) with the objective of using the propellant (pressurised dimethyl ether) as the solvent. Dimethyl ether is volatile but environmentally friendly. The binder used was polystyrene-b-polyisoprene-b-polystyrene (having 14% styrene). Synthetic fibres (polyethylene) were used. Additives were also used comprising silicone oil as a lubricant and Hypermer LP1 surfactant as a stablizer. After clamping in the valve the aerosol can was left for one week with occasional shaking to allow the binder to dissolve. When the composition is stirred uniformly, the binder only takes 24 hours to dissolve.

| COMPONENT | INGREDIENTS | QUANTITY |
|---|---|---|
| Binder | Polysytrene-b-Polyisoprene-b-Polystyrene (14%) | 4.5 g |
| Propellant and solvent | Pressurised Dimethyl ether | 100 ml |
| EITHER Fibres | Polyethylene fibres with length less than 150 microns | 4.0-4.5 g |
| OR Fibres | Hydrophobic cotton fibres with length less than 150 microns | 4.0-4.5 g |
| Additive | Silicone Oil | 1 ml |
| Additive | Hypermer LP1 | 0.5 g |

Example 2

The binder used was polystyrene-b-polyisoprene-b-polystyrene (having 14% styrene). This was dissolved in petroleum ether (boiling point 30° C. to 60° C.). The fibres used were either polyethylene fibres or hydrophobic cotton fibres, both having a length in the range of less than 150 microns. The additive used as a lubricant was 1 ml of silicone oil for every 50 ml of the formulation. As a stabiliser, surfactants from Uniqema with a trade name Hypermer LP1 s were used with 0.5 grams for every 50 grams of the formulation.

| COMPONENT | INGREDIENTS | QUANTITIES |
|---|---|---|
| Binder | Polystyrene-b-Polyisoprene-b-Polystyrene (14% styrene) | 10 g |
| Solvent | Petroleum Ether Bpt (30-60)° C. | 300 ml |
| EITHER Fibres | Polyethylene fibres with length less than 150 microns | 4.0-4.5 g |
| OR Fibres | Hydrophobic cotton fibres with length less than 150 microns | 4.0-4.5 g |
| Additive | Hypermer LP1 | 0.5 g per 50 g of formulation |
| Additive | Silicone oil | 1 ml per 50 ml of formulation |

Dimethyl ether was used as the propellant in a ratio of 40% formulation to 60% dimethyl ether.

Example 3

The binder used was polystyrene-b-polyisoprene-b-polystyrene (having 14% styrene). This was dissolved in 300 ml of dimethoxymethane. The fibre types used were synthetic polyethylene or natural hydrophobic cotton having a length of less than 150 microns. The additive used as a lubricant was 1 ml of silicone oil for every 50 ml of the formulation. The stabilisers used were surfactants from Uniqema with a trade name Hypermer LP1. The amount used was 0.5 grams for every 50 grams of the formulation.

| COMPONENT | INGREDIENTS | QUANTITIES |
|---|---|---|
| Binder | Polystyrene-b-Polyisoprene-b-Polystyrene (14% styrene) | 25 g |
| Solvent | Dimethoxymethane | 300 ml |
| EITHER Fibres | Polyethylene fibres with length less than 150 microns | 12.0-12.5 g |
| OR Fibres | Hydrophobic cotton fibres with length less than 150 microns | 12.0-12.5 g |
| Additive | Hypermer LP1 | 0.5 g per 50 g of formulation |
| Additive | Silicone oil | 1 ml per 50 ml of formulation |

This formulation works with dimethyl ether as the propellants in ratio of 40% formulation and 60% dimethyl ether, which gives a fluffy fabric.

Example 4

The binder used was polystyrene-b-polybutadiene-b-polystyrene (Mw 140,000). This was dissolved in diethyl ether (by stirring for 12 hours).

The fibre types used were polyethylene (synthetic) or hydrophobic cotton (natural) having a length of less than 150 microns. The additive used was 1 ml of silicone oil for every 50 ml of the formulation. The stabilisers used were surfactants from Uniqema with a trade name Hypermer LP1. The amount used was 0.5 grams for every 50 grams of the formulation. This formulation was compatible with the propellant dimethyl ether (DME), applied in a 40:60 (solution:propellant).

| COMPONENT | INGREDIENTS | QUANTITIES |
|---|---|---|
| Binder | Polystyrene-b-polybutadiene-b-Polystyrene | 30 g |
| Solvent | Diethyl ether | 300 ml |
| EITHER Fibres | Polyethylene fibres with length less than 150 microns | 4.0-4.5 g |
| OR Fibres | Hydrophobic cotton fibres with length less than 150 microns | 4.0-4.5 g |
| Additive | Hypermer LP1 | 0.5 g per 50 g of formulation |
| Additive | Silicone oil | 1 ml per 50 ml of formulation |

Example 5

The binder used was polystyrene-b-poly(ethylene-ran-butyrene)-b-polystyrene. This was dissolved in petroleum ether and dimethyoxymethane (by stirring for 12 hours).

The fibre types used were polyethylene (synthetic) or hydrophobic cotton (natural) having a length of less than 150 microns. The stabilisers used were surfactants from Uniqema with a trade name Hypermer LP1. The amount required was 0.5 grams for every 50 grams of the formulation. This formulation was compatible with the propellant Dimethyl ether, applied in a 40:60 (solution:propellant).

| COMPONENT | INGREDIENTS | QUANTITIES |
|---|---|---|
| Binder | Polystyrene-b-poly(ethylene-ran-butyrene)-polystyrene (30% polystyrene) | 15 g |
| Solvent | Petroleum ether | 300 ml |
| Solvent | Dimethoxymethane | 50 ml |
| EITHER Fibres | Polyethylene fibres with length less than 150 microns | 4.0-4.5 g |
| OR Fibres | Hydrophobic cotton fibres with length less than 150 microns | 4.0-4.5 g |
| Additive | Hypermer LP1 | 0.5 g per 50 g of formulation |

The invention claimed is:

1. A method for producing a non-woven fabric comprising the steps of:
   a) providing a container containing a composition which is capable of producing a spray of the composition, wherein the composition comprises fibres, a binder and a diluent characterized in that the binder is a thermoplastic elastomeric block copolymer and;
   b) spraying the composition onto a supporting surface.

2. The method of claim 1, wherein the binder is a styrene-diene-styrene triblock copolymer.

3. The method according to claim 2 wherein the diene is butadiene or isoprene.

4. The method of claim 1 wherein the diluent comprises a propellant and/or a solvent.

5. The method of claim 1 wherein the diluent comprises a propellant selected from the group consisting of liquefied petroleum gas, dimethyl ether or carbon dioxide and mixtures thereof.

6. The method of claim 1, wherein the diluent comprises a propellant which makes up between 20 and 90% of the composition.

7. The method of claim 1, wherein the diluent comprises a solvent selected from the group consisting of petroleum ether having a boiling point of between 30 to 60° C., dimethoxymethane, diethyl ether and dimethyl ether.

8. A method according to claim 1, wherein the diluent in the composition comprises a propellant and step a) comprises pressurising the container above 1 and up to 20 atmospheres.

9. A method according to claim 1, wherein the spray formed in step b) is a fine spray with droplet size less than 500 micron.

10. A method according to claim 1, wherein the distance between a spray point on the container and the supporting surface is 10 to 200 cm.

11. The method according to claim 6, wherein the diluent comprises a propellant which makes up between 40 and 80% of the composition by weight based on the total weight of the composition.

12. The method according to claim 11, wherein the diluent comprises a propellant which makes up between 50 and 70% of the composition by weight based on the total weight of the composition.

13. The method of claim 1, wherein the is diluent comprises dimethyl ether.

14. The method of claim 10, wherein the distance between the spray point on the container and the supporting surface is 50 to 150 cm.

15. The method of claim 2, wherein the diluent comprises a propellant and/or a solvent.

16. The method of claim 3, wherein the diluent comprises a propellant selected from the group consisting of liquefied petroleum gas, dimethyl ether and carbon dioxide and mixtures thereof.

17. The method of claim 16, wherein the diluent comprises a propellant which makes up between 20 and 90% of the composition by weight, based on the total weight of the composition.

18. The method of claim 17, wherein the diluent comprises a solvent selected from the group consisting of a solvent selected from the group consisting of petroleum ether having a boiling point of between 30 to 60° C., dimethoxymethane, diethyl ether and dimethyl ether.

19. The method of claim 17, wherein the diluent comprises dimethyl ether.

20. The method of claim 18, wherein the diluent in the composition comprises a propellant and step a) comprises pressurizing the container above 1 and up to 20 atmospheres.

21. The method of claim 20, wherein the spray formed in step b) is a fine spray with droplet size less than 500 micron.

22. The method of claim 21, wherein the distance between a spray point on the container and the supporting surface is 10 to 200 cm.

23. The method of claim 22, wherein the distance between the spray point on the container and the supporting surface is 50 to 150 cm, and step a) comprises pressurizing the container between 8 and 15 atmospheres.

* * * * *